UNITED STATES PATENT OFFICE.

CAMILLE LEON CHARLES BERTOU, OF PARIS, FRANCE.

PROCESS OF PRECIPITATING OXIDE OF TIN FROM SOLUTIONS.

SPECIFICATION forming part of Letters Patent No. 489,624, dated January 10, 1893.

Application filed April 14, 1892. Serial No. 429,199. (No specimens.)

*To all whom it may concern:*

Be it known that I, CAMILLE LEON CHARLES BERTOU, of Paris, in the Republic of France, have invented a new and useful Improvement in the Process of Precipitating Oxide of Tin from Solutions, of which the following is a specification.

The object of this invention is the precipitation of tin in the form of an oxide from solutions containing it either alone or mixed with other metals and is especially designed for use upon the solutions of tin obtained by the process which is the subject of my application for Letters Patent Serial No. 390,828 filed April 28, 1891, according to which scraps and waste of tin plate are placed in a bath at a temperature of 50° centigrade composed of hydrochloric acid and a nitrate in which the proportion of the nitrate is about six per cent. of the weight of the acid, then adding more of the scraps or waste in successive charges and in the meantime gradually raising the temperature of the bath as it becomes more and more saturated with tin and weaker in the nitrate.

This invention consists in precipitating the tin from the solution in the state of an oxide by the combined employment of a carbonate of an alkaline earth metal and a carbonate of an alkali metal as hereinafter set forth. I choose by preference carbonate of lime and carbonate of soda because of their cheapness and their light atomic weight.

The process of precipitation may be performed in the bath in which the tin solution to be treated has been obtained or in any suitable bath. While the solution is maintained at a temperature near but below the boiling point and exposed to the atmosphere, I add the carbonate of lime very gradually in small quantities until the precipitation of the oxide of tin (which precipitates first) is completed, in order not to precipitate afterward in the state of oxide or carbonate any iron, zinc, lead or copper which may be contained in the liquor. At the successive additions of the carbonate of lime there will be observed a disengagement of carbonic acid which indicates that all the tin has not been precipitated, but as soon as the gaseous disengagement ceases, this part of the operation may be considered as terminated. Then after the contents of the bath have been allowed to cool, the precipitate is collected and is first washed with cold water and afterward suspended in water at any temperature below the ebullition point to which is added gradually or in small quantities the carbonate of soda until the liquor shows a slightly alkaline reaction when it may be known that the dechloridization is completed and pure oxide of tin is obtained. All that now remains to be done is to transform this oxide into metal which may be done with great facility by any of the known means.

Having described my invention, what I claim and desire to secure by Letters Patent is:

The within described improvement in the process of precipitating tin in the form of an oxide from solutions containing it, consisting in first adding carbonate of lime to the solution while the latter is exposed to the air at a temperature nearly but below ebullition and gradually continuing such addition until the precipitation of the tin is completed, then allowing the liquor to cool and collecting the precipitate therefrom, next washing the precipitate with cold water and afterward suspending the washed precipitate in a solution of a carbonate of an alkali metal the strength of which is gradually increased until it presents a slightly alkaline reaction.

In witness whereof I have hereunto set my hand in the presence of two subscribing witnesses.

CAMILLE LEON CHARLES BERTOU.

Witnesses:
LOUIS GENET,
ROBT. M. HOOPER.